(12) United States Patent
Chou et al.

(10) Patent No.: US 12,408,248 B2
(45) Date of Patent: Sep. 2, 2025

(54) LED POWER SUPPLY

(71) Applicant: Delta Electronics, Inc., Taoyuan (TW)

(72) Inventors: Ching-Ho Chou, Taoyuan (TW); Yung-Chuan Lu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 116 days.

(21) Appl. No.: 18/398,364

(22) Filed: Dec. 28, 2023

(65) Prior Publication Data

US 2024/0430999 A1  Dec. 26, 2024

(30) Foreign Application Priority Data

Jun. 21, 2023 (CN) .......................... 202310744025.1
Oct. 12, 2023 (CN) .......................... 202311321409.9

(51) Int. Cl.
*H05B 45/37* (2020.01)
*H05B 45/14* (2020.01)
*H05B 45/50* (2022.01)

(52) U.S. Cl.
CPC ............. *H05B 45/37* (2020.01); *H05B 45/14* (2020.01); *H05B 45/50* (2020.01)

(58) Field of Classification Search
CPC ........ H05B 45/37; H05B 45/14; H05B 45/50; H05B 45/382; H05B 45/34; H05B 45/345; H05B 45/3725; H02H 3/243; H02H 7/1213; H02M 3/33507
See application file for complete search history.

(56) References Cited

U.S. PATENT DOCUMENTS

| | | | |
|---|---|---|---|
| 8,503,146 B1 | 8/2013 | Shekhawat | |
| 2019/0190396 A1 | 6/2019 | Wei et al. | |
| 2020/0343818 A1* | 10/2020 | Lin | H02M 3/33569 |
| 2023/0006460 A1* | 1/2023 | Jiang | H02J 7/00034 |
| 2023/0092299 A1* | 3/2023 | Chien | H02M 3/33507 |
| | | | 363/13 |

FOREIGN PATENT DOCUMENTS

| | | |
|---|---|---|
| CN | 101304211 A | 11/2008 |
| CN | 101442260 A | 5/2009 |

(Continued)

*Primary Examiner* — Minh Tran
(74) *Attorney, Agent, or Firm* — KIRTON McCONKIE; Evan R. Witt

(57) ABSTRACT

An LED power supply is provided. The LED power supply adopts constant-voltage/constant-current control, supplies power to an LED device, and includes an isolated DC-DC conversion circuit having primary and secondary sides and a control module. The control module includes a control unit, a feedback circuit, first and second switches and an optocoupler. The control unit is electrically connected to the primary side and controls operation of the conversion circuit. The optocoupler is configured for signal transmission with electrical isolation and includes a transmitter and a receiver electrically connected to the secondary side and the control unit respectively. When the output voltage is lower than a threshold voltage, the first switch is turned off, the second switch is turned on to trigger the optocoupler to generate a trigger signal at the receiver, and the control unit controls the isolated DC-DC conversion circuit to stop operating based on the trigger signal.

13 Claims, 8 Drawing Sheets

(56) References Cited

FOREIGN PATENT DOCUMENTS

| | | |
|---|---|---|
| CN | 203884016 U | 10/2014 |
| CN | 107667464 A | 2/2018 |
| CN | 212588268 U | 2/2021 |
| CN | 114374188 A | 4/2022 |
| EP | 2590308 B1 | 5/2013 |
| JP | 2017016919 A | 1/2017 |
| TW | 201242416 A | 10/2012 |
| TW | 202005217 A | 1/2020 |
| TW | 202013872 A | 4/2020 |

* cited by examiner

LED POWER SUPPLY

CROSS-REFERENCE TO RELATED APPLICATION

This application claims priority to China Patent Application No. 202310744025.1, filed on Jun. 21, 2023, and China Patent Application No. 202311321409.9, filed on Oct. 12, 2023, and the entire contents of which are incorporated herein by reference for all purposes.

FIELD OF THE INVENTION

The present disclosure relates to a power supply, and more particularly to an LED (light-emitting diode) power supply.

BACKGROUND OF THE INVENTION

The control for output voltage and current of LED power supplies may be classified into constant-voltage control, constant-current control, constant-voltage/constant-current control, and constant-power control. FIG. 1 exemplifies the voltage-current characteristic curves corresponding to different kinds of control.

Conventional LED power supplies adopt constant-voltage control in which the output voltage is fixed and the output current is proportional to the load. When the overload condition occurs, the current increases to trigger the overcurrent protection. Under the constant-voltage control, the triggering current of the overcurrent protection needs to be higher than the full-load current by a certain level (e.g., 30%) so as to avoid false triggering of the overcurrent protection. It requires the design for the LED power supply to reserve a larger margin. However, according to the requirement of UL Class 2 for the output of 24V/100 W, it is not feasible to design the triggering current of overcurrent protection to be 1.3 times of the rated current.

Therefore, the LED power supply usually adopt the constant-voltage/constant-current control instead. When the output load is less than the rated load, the LED power supply operates in the constant-voltage control mode and provides a fixed output voltage. Conversely, when the output load is greater than or equal to the rated load, the LED power supply operates in the constant-current control mode and outputs a fixed output current. Consequently, the margin reserved for the overload protection of the LED power supply is reduced.

However, in several fire incidents in Japan recently, the rainwater penetrates into the LED module to cause partial micro short circuit and make the LED strip catch fire. In specific, under constant-voltage/constant-current control, the micro short circuit at output causes the output load to be greater than the rated load, and the LED power supply detects this situation and operate in the constant-current control mode. Although the LED power supply may reduce the output voltage due to the increasing level of the micro short circuit of the LED load, the LED power supply still continues to provide a fixed output current. Even if the LED load generates an electric arc due to the micro short circuit and catches fire, the LED power supply is unable to activate the short-circuit protection function.

Therefore, there is a need of providing an LED power supply in order to overcome the drawbacks of the conventional technologies.

SUMMARY OF THE INVENTION

The present disclosure provides an LED power supply adopting the constant-voltage/constant-current control. When the output voltage of the LED power supply is lower than a threshold voltage, the protection is activated instantly to stop the operation of the LED power supply. Consequently, the LED power supply stops operating instantly when the output voltage is abnormal (e.g., caused by the micro short circuit at load), thereby protecting the LED power supply and the LED device powered by the LED power supply.

In accordance with an aspect of the present disclosure, an LED power supply is provided. The LED power supply adopts constant-voltage/constant-current control and is configured to supply power to an LED device. The LED power supply includes an input terminal, an output terminal, an isolated DC-DC conversion circuit and a control module. The isolated DC-DC conversion circuit has a primary side and a secondary side electrically connected to the input terminal and the output terminal respectively and is configured to receive an input voltage from the input terminal and provide an output voltage to the output terminal. The control module includes a first control unit, a feedback circuit, a first switch, a second switch and an optocoupler. The first control unit is electrically connected to the primary side and is configured to control operation of the isolated DC-DC conversion circuit. The feedback circuit is electrically connected to the output voltage and includes a first resistor, a first diode and a second resistor electrically connected in series. The first switch is electrically connected to the feedback circuit. The second switch is electrically connected to the first switch. The optocoupler is configured for signal transmission with electrical isolation and includes a transmitter and a receiver electrically connected to the secondary side and the first control unit respectively. When the output voltage is lower than a threshold voltage, the first switch is turned off, the second switch is turned on to trigger the optocoupler to generate a trigger signal at the receiver, and the first control unit controls the isolated DC-DC conversion circuit to stop operating based on the trigger signal.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
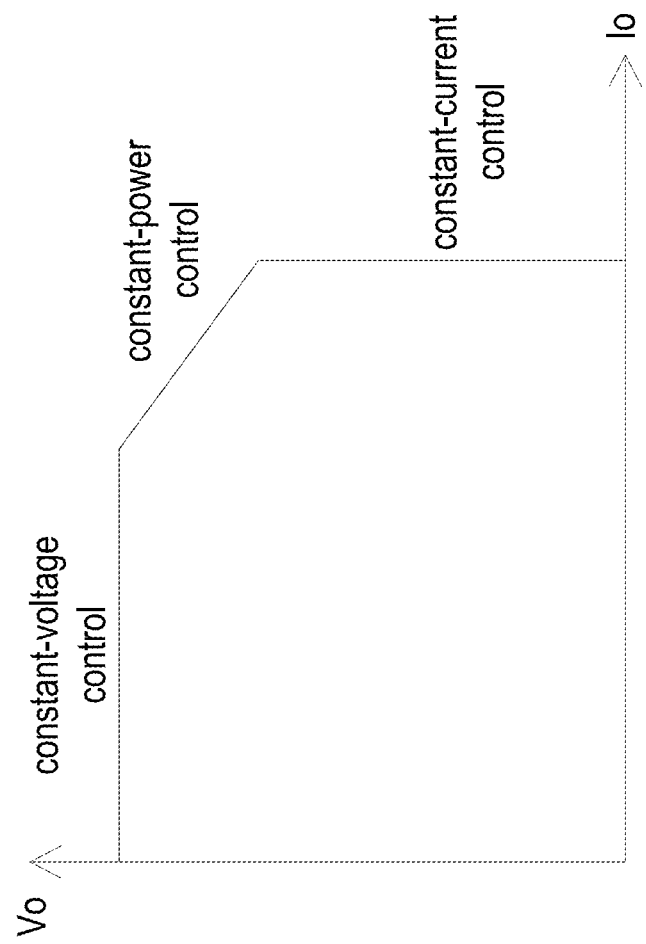
FIG. 1 exemplifies the voltage-current characteristic curves corresponding to different kinds of control.
Figure 2:
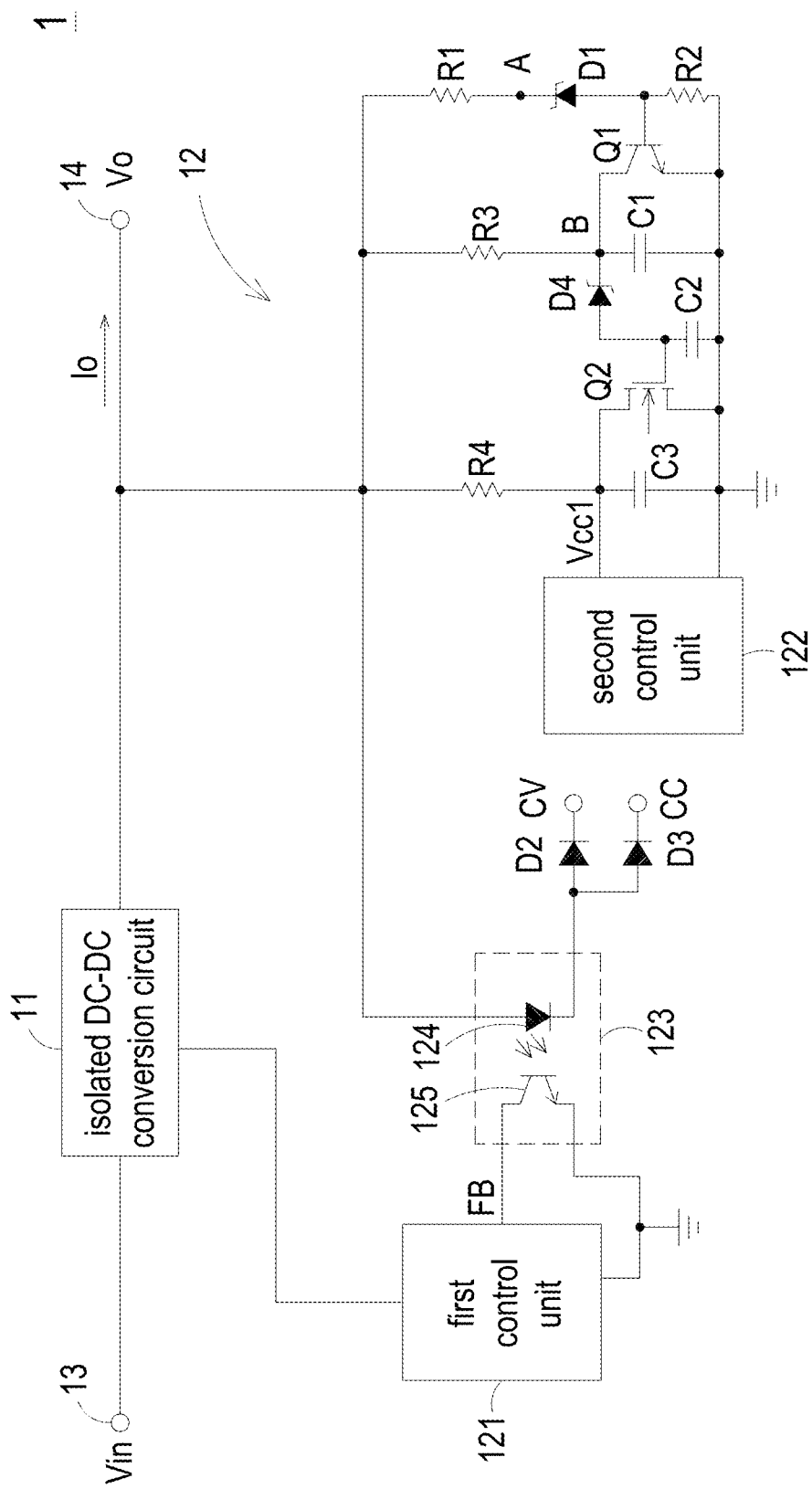
FIG. 2 is a schematic circuit diagram illustrating an LED power supply according to a first embodiment of the present disclosure.

FIG. 2 is a schematic circuit diagram illustrating an LED power supply according to a first embodiment of the present disclosure. As shown in FIG. 2, the LED power supply 1 of the present disclosure adopts constant-voltage/constant-current control and is configured to supply power to an LED device (not shown). The LED power supply 1 includes an isolated DC-DC conversion circuit 11, a control module 12, an input terminal 13 and an output terminal 14. The isolated DC-DC conversion circuit 11 has a primary side and a secondary side electrically connected to the input terminal 13 and the output terminal 14 respectively. The primary side is used to receive an input voltage Vin from the input terminal 13. Through the conversion of the isolated DC-DC conversion circuit 11, the secondary side provides an output voltage Vo and an output current Io of the LED power supply 1 to the output terminal 14. In some embodiments, the input voltage Vin received by the input terminal 13 is provided to the primary side of the isolated DC-DC conversion circuit 11 through a power factor correction circuit (not shown). The control module 12 includes a first control unit 121, a second control unit 122, a feedback circuit, a first switch Q1, a second switch Q2 and an optocoupler. The optocoupler includes a first optocoupler 123, but not limited thereto.

The first control unit 121 is electrically connected to the primary side of the isolated DC-DC conversion circuit 11 and is configured to control the operation of the isolated DC-DC conversion circuit 11. Further, the first control unit 121 has a feedback terminal FB. The feedback circuit is electrically connected to the output voltage Vo and includes a resistor R1, a diode D1 (Zener diode) and a resistor R2 electrically connected in series. The first switch Q1 is electrically connected to the feedback circuit and the second switch Q2. The first optocoupler 123 is used for the signal transmission with electrical isolation, and the first optocoupler 123 includes a transmitter 124 and a receiver 125 electrically connected to the secondary side of the isolated DC-DC conversion circuit 11 and the first control unit 121 respectively. The second control unit 122 is electrically connected to the secondary side of the isolated DC-DC conversion circuit 11 and the transmitter 124. The second control unit 122 is configured to detect the output voltage Vo and output current Io and generate a control signal accordingly. The control signal generated by the second control unit 122 is transmitted to the feedback terminal FB of the first control unit 121 through the first optocoupler 123. The first control unit 121 controls the operation of the isolated DC-DC conversion circuit 11 according to the control signal.

Figure 3:
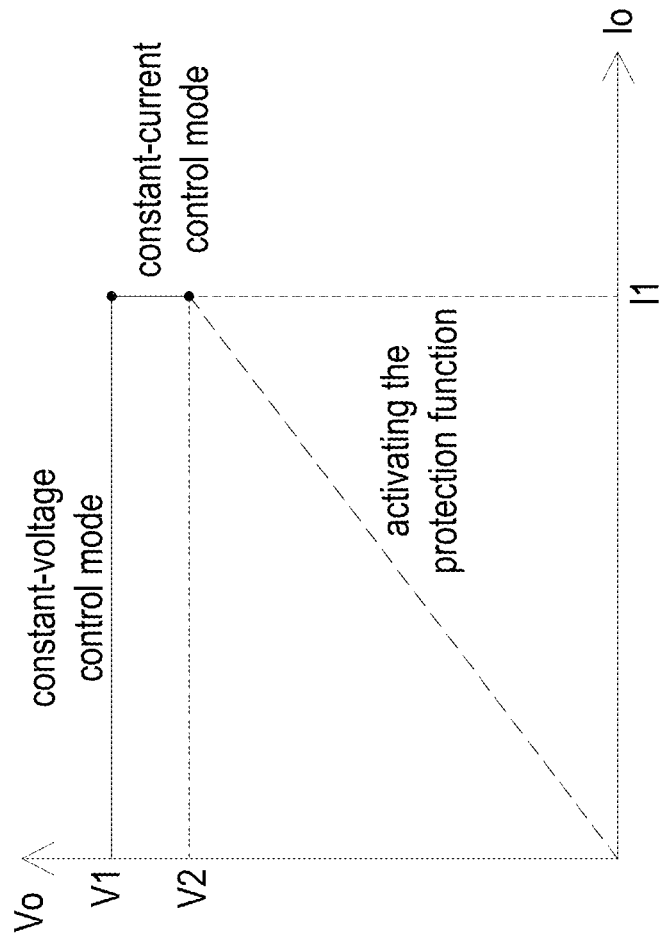
FIG. 3 schematically shows a graph of the output voltage versus the output current of the LED power supply of FIG. 2.

FIG. 3 schematically shows a graph of the output voltage versus the output current of the LED power supply of FIG. 2. As shown in FIG. 2 and FIG. 3, when the output load of the LED power supply 1 is less than a rated load, the isolated DC-DC conversion circuit 11 operates in a constant-voltage control mode. Under the constant-voltage control mode, the first switch Q1 is turned on, the second switch Q2 is turned off, the output current Io is less than a threshold current I1, and the isolated DC-DC conversion circuit 11 outputs a fixed output voltage Vo (equal to the rated voltage V1). When the output load is greater than or equal to the rated load, the isolated DC-DC conversion circuit 11 operates in a constant-current control mode. Under the constant-current control mode, if the output voltage Vo is higher than the threshold voltage V2, the second switch Q2 remains off, and the isolated DC-DC conversion circuit 11 outputs a fixed output current Io (equal to a threshold current I1). Alternatively, if the output voltage Vo is lower than the threshold voltage V2, the second switch Q2 turns on to trigger the optocoupler to generate a trigger signal at the receiver. Further, based on the trigger signal, the first control unit 121 controls the isolated DC-DC conversion circuit 11 to stop operating. The threshold voltage V2 is for example but not limited to be equal to 80% of the rated voltage V1. The specific magnitude of the threshold voltage V2 may be set according to actual requirements.

Particularly, in the first embodiment shown in FIG. 2, if the output voltage Vo is lower than the threshold voltage V2, the second switch Q2 turns on to make the supply voltage Vcc1 grounded, and the first optocoupler 123 is triggered to generate the trigger signal at the receiver 125. Further, the trigger signal increases the voltage level at the feedback terminal FB of the first control unit 121, and thus the first control unit 121 activates the protection function to control the isolated DC-DC converter circuit 11 to stop operating.

Consequently, the LED power supply 1 of the present disclosure stops operating instantly when the output voltage Vo is abnormal (e.g., caused by the micro short circuit at load), thereby protecting the LED power supply 1 and the LED device powered by the LED power supply 1.

Please refer to FIG. 2 again. In the first embodiment shown in FIG. 2, the control module 12 further includes a constant-voltage control terminal CV, a constant-current control terminal CC, and diodes D2 and D3. The first terminal of the transmitter 124 is electrically connected to the secondary side of the isolated DC-DC conversion circuit 11, the second control unit 122 and the output terminal 14. The second terminal of the transmitter 124 is electrically connected to anodes of the diodes D2 and D3, and cathodes of the diodes D2 and D3 are electrically connected to the constant-voltage control terminal CV and the constant-current control terminal CC respectively. The constant-voltage control terminal CV is configured to receive the control signal generated by the second control unit 122 under the condition that the output load is less than the rated load. The control signal is transmitted to the first control unit 121 through the constant-voltage control terminal CV and the first optocoupler 123, and the first control unit 121 controls the isolated DC-DC conversion circuit 11 to operate in the constant-voltage control mode according to the control signal. In addition, the constant-current control terminal CC is configured to receive the control signal generated by the second control unit 122 under the condition that the output load is greater than or equal to the rated load and the output voltage Vo is higher than the threshold voltage V2. The control signal is transmitted to the first control unit 121 through the constant-current control terminal CC and the first optocoupler 123, and the first control unit 121 controls the isolated DC-DC conversion circuit 11 to operate in the constant-current control mode according to the control signal.

Moreover, the feedback circuit further includes a resistor R3, a capacitor C1, a diode D4 (Zener diode) and a capacitor C2. Two terminals of the resistor R1 are electrically connected to the output voltage Vo and a node A respectively. A cathode and an anode of the diode D1 are electrically connected to the node A and a first terminal of the resistor R2 respectively. Two terminals of the resistor R3 are electrically connected to the output voltage Vo and a node B respectively. A first terminal, a second terminal, and a third terminal of the first switch Q1 are electrically connected to the node B, the anode of the diode D1, and a second terminal of the resistor R2 respectively. Two terminals of the capacitor C1 are electrically connected to the node B and the third terminal of the first switch Q1 respectively. A cathode and an anode of the diode D4 are electrically connected to the node B and a first terminal of the capacitor C2. The second switch Q2 is electrically connected to the anode of the diode D4 and the capacitor C2. In addition, the control mode 12 further includes a resistor R4 and a capacitor C3 electrically connected in series between the output voltage Vo and the ground terminal. The resistor R4 and the capacitor C3 are electrically connected to the output voltage Vo and the ground terminal respectively, and a connection node between the resistor R4 and the capacitor C3 is further electrically connected to the second control unit 122. For example, the first switch Q1 may be an NPN-type transistor, and the first, second and third terminals of the first switch Q1 are the collector, base and emitter respectively, but not limited thereto. For example, the second switch Q2 may be a field effect transistor, and the first, second and third terminals of the second switch Q2 are the drain, gate and source respectively, but not limited thereto.

In the first embodiment shown in FIG. 2, it is noted that the first, second and third terminals of the second switch Q2 are electrically connected to the second control unit 122, the anode of the diode D4, and the ground terminal respectively. In the first embodiment, except for transmitting the control signal used to control isolated DC-DC conversion circuit 11 to operate in the constant-voltage or constant-current control mode, the first optocoupler 123 further generates the trigger signal when the output voltage Vo is lower than the threshold voltage V2, and the trigger signal makes the first control unit 121 activate the protection function for controlling the isolated DC-DC conversion circuit 11 to stop operating. The specific operation principle is described as follows.

Figure 4:
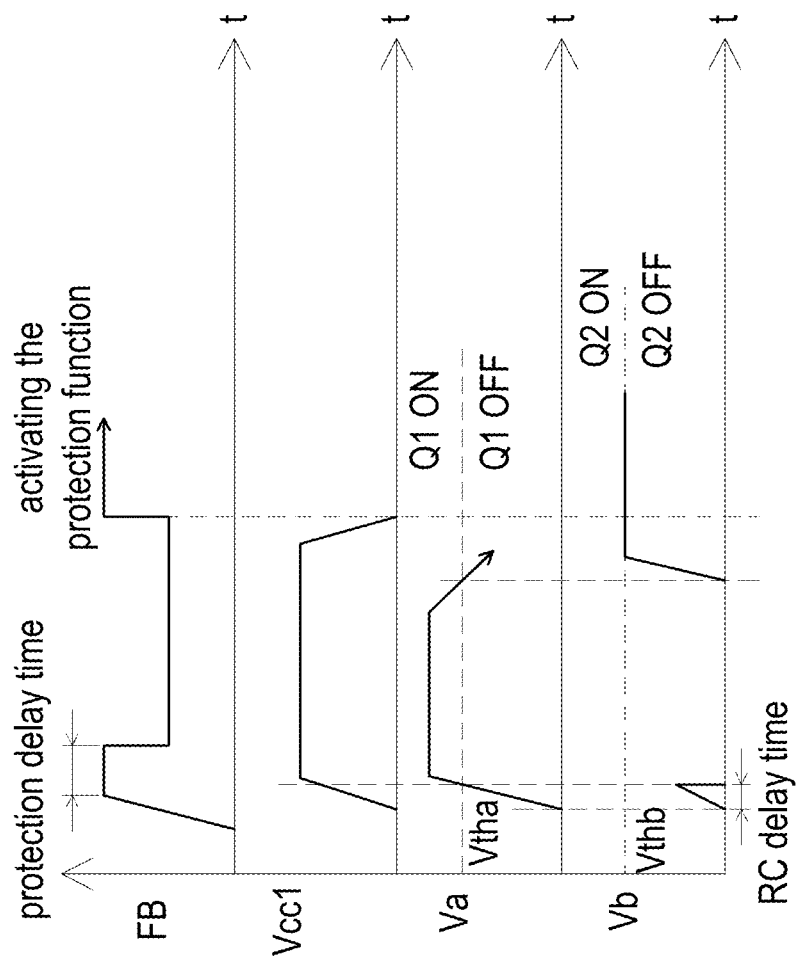
FIG. 4 is a schematic time sequence diagram of the LED power supply of FIG. 2.

Please refer to FIG. 2 and FIG. 4. FIG. 4 is a schematic time sequence diagram of the LED power supply of FIG. 2. In FIG. 4, FB represents the voltage level at the feedback terminal FB, Va is the voltage at the node A, and Vb is the voltage at the node B. Since the voltage Va at the node A is proportional to the output voltage Vo of the LED power supply 1, the voltage Va can reflect the variation in the magnitude of output voltage Vo. As shown in FIG. 2 and FIG. 4, when the LED power supply 1 starts initially, the output voltage Vo gradually increases, and the supply voltage Vcc1 gradually increases correspondingly. Since the output voltage Vo has not reached the preset threshold of constant-voltage control, the voltage level at the feedback terminal FB remains high. During the process of establishing high voltage level at feedback terminal FB, both the first switch Q1 and the second switch Q2 are initially in the off state, and the voltage Va at node A gradually increases. When the voltage Va is less than the threshold Vtha, the RC circuit formed by resistor R3 and capacitor C1 charges to make the voltage Vb at node B increase gradually. The time taken for the voltage Va to increase from zero to the threshold Vtha is the RC delay time. As the voltage Va reaches the threshold Vtha, the first switch Q1 is turned on, and the RC circuit discharges to let the voltage Vb decrease to zero. When the output voltage Vo is higher than the threshold voltage V2, the voltage Va is higher than the threshold Vtha correspondingly. It is noted that there is a period of protection delay time for the first control unit 121 when the high voltage level at the feedback terminal FB is established initially so as to avoid falsely triggering the protection function by the high voltage level at the feedback terminal FB. As the output voltage Vo reaches the preset threshold of constant-voltage control, the second control unit 122 begins feedback control, the voltage level at the feedback terminal FB returns to low level, the first switch Q1 remains in the on state, and the second switch Q2 remains in the off state.

Afterwards, assuming that the output voltage Vo decreases due to abnormal condition, the voltage Va also decrease correspondingly. As the voltage Va decreases to be lower than the threshold Vtha, the first switch Q1 is turned off, and the RC circuit charges to let the voltage Vb increase. When the voltage Vb reaches the threshold Vthb, the second switch Q2 is turned on. Accordingly, the supply voltage Vcc1 is grounded, the second control unit 122 stops generating the control signal, and the voltage level at the feedback terminal FB increases to high level. After the duration of the voltage level at the feedback terminal FB being in high level exceeds a preset time, the first control unit 121 activates the protection function to control the isolated DC-DC converter circuit 11 to stop operating.

Figure 5:
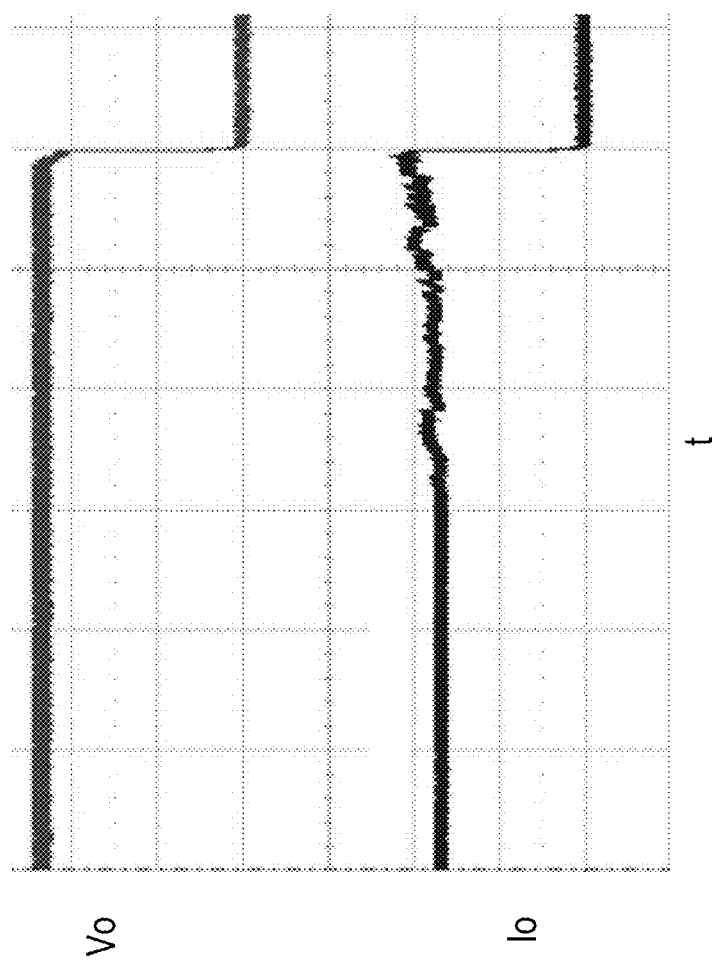
FIG. 5 exemplifies the experimental waveforms of the LED power supply of FIG. 2.

FIG. 5 exemplifies the experimental waveforms of the LED power supply of FIG. 2. As shown in FIG. 5, when a micro short circuit or over-power condition occurs in the output LED load, the LED power supply 1 operates in the constant-current control mode. If the micro short circuit or over-power condition of the LED worsens, the output voltage Vo further decreases correspondingly. Once the output voltage Vo decreases to the preset threshold voltage, the protection function is activated instantly to make the LED power supply 1 stop operating so that the output current Io is reduced rapidly to avoid damage to the LED power supply 1 and the LED device powered by the LED power supply 1.

According to the descriptions above, when the output voltage Vo is too low (i.e., lower than the threshold voltage V2), through the operation of the feedback circuit and the first switch Q1, the second switch Q2 is turned on to trigger the optocoupler to generate the trigger signal at the receiver, and first control unit 121 controls the isolated DC-DC conversion circuit 11 to stop operating based on the trigger signal so that the protection is realized. It is noted that the manner of disposing and triggering the optocoupler and the specific way of the first control unit 121 controlling the isolated DC-DC conversion circuit 11 to stop operating based on the trigger signal are not limited to that exemplified in the first embodiment. Various kinds of other possible implementations are exemplified as follows.

Figure 6:
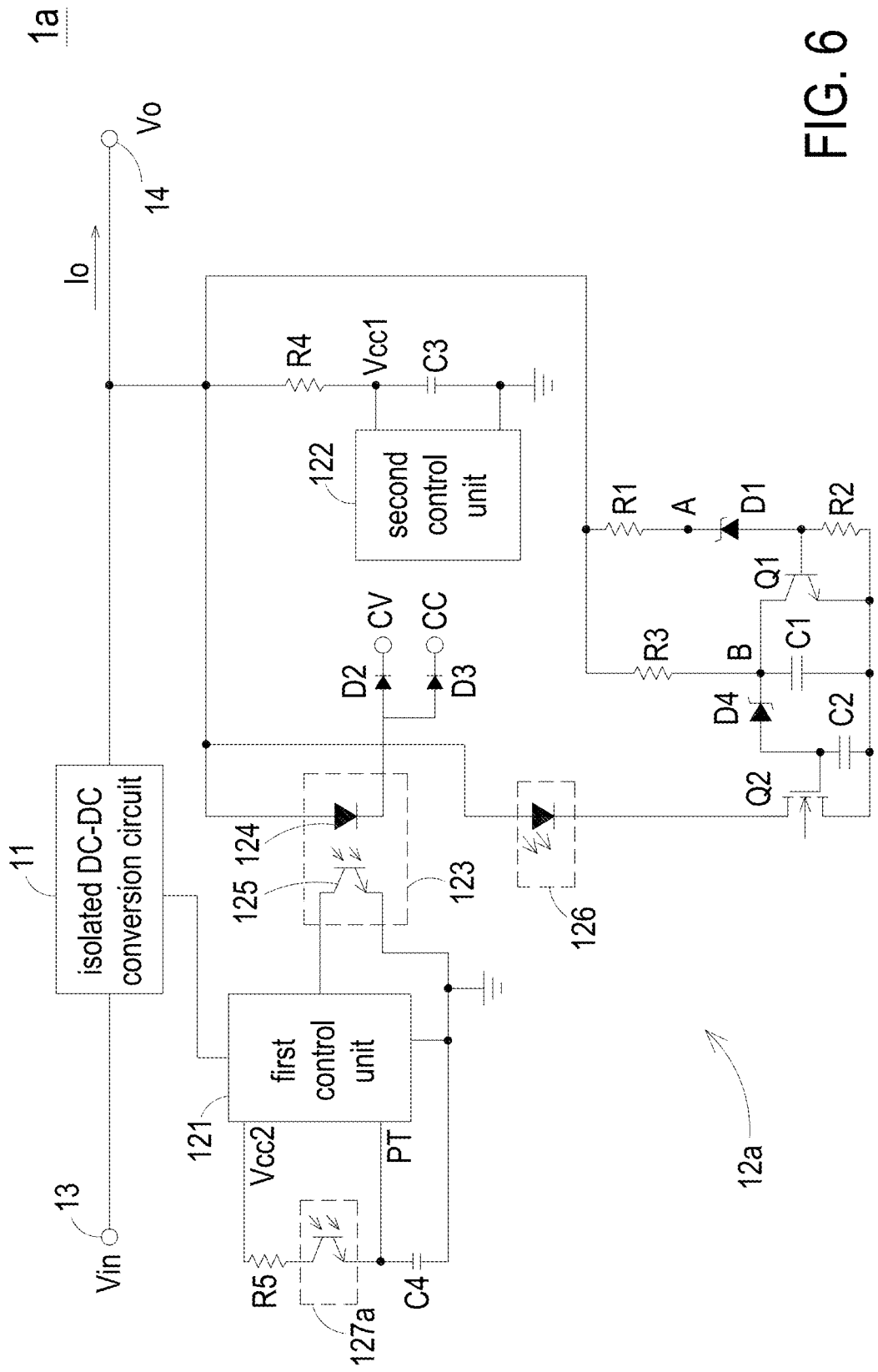
FIG. 6 is a schematic circuit diagram illustrating an LED power supply according to a second embodiment of the present disclosure.

FIG. 6 is a schematic circuit diagram illustrating an LED power supply according to a second embodiment of the present disclosure. In FIG. 6, the structure or components corresponding to those of FIG. 2 are designated by identical numeral references, and detailed descriptions thereof are omitted herein. Different from the LED power supply 1 of FIG. 2, in the LED power supply 1a of FIG. 6, the optocoupler of the control module 12a further includes a second optocoupler. As shown in FIG. 6, two terminals of a transmitter 126 of the second optocoupler are electrically connected to the output voltage Vo and the first terminal of the second switch Q2 respectively. The second and third terminals of the second switch Q2 are electrically connected to the anode of the diode D4 and the second terminal of the capacitor C2 respectively. Two terminals of a receiver 127a of the second optocoupler are electrically connected to a supply voltage Vcc2 and the protection trigger terminal PT of the first control unit 121 respectively. When the output voltage Vo is lower than the threshold voltage V2, based on the feedback circuit (the operation principle thereof is the same as that shown in the first embodiment), the first switch Q1 is turned off, and the second switch Q2 is turned on to trigger the second optocoupler. Accordingly, the receiver 127a of the second optocoupler generates the trigger signal to increase the voltage level at the protection trigger terminal PT, and thus the first control unit 121 activates the protection function to control the isolate DC-DC conversion circuit 11 to stop operating. In an embodiment, the control module 12a further includes a resistor R5 and a capacitor C4. The resistor R5 is electrically connected between the receiver 127a of the second optocoupler and the supply voltage Vcc2 of the first control unit 121. Two terminals of the capacitor C4 are electrically connected to the protection trigger terminal PT and the ground terminal respectively. Consequently, in the second embodiment, the first optocoupler 123 is used to transmit the control signal for controlling the isolated DC-DC conversion circuit 11 to operate in the constant-voltage or constant-current control mode, and the second optocoupler is used to generate the trigger signal when the output voltage Vo is lower than the threshold voltage V2. Due to the voltage level at the protection trigger terminal PT increased by the trigger signal, the first control unit 121 activates the protection function to control the isolated DC-DC conversion circuit 11 to stop operating.

Figure 7:
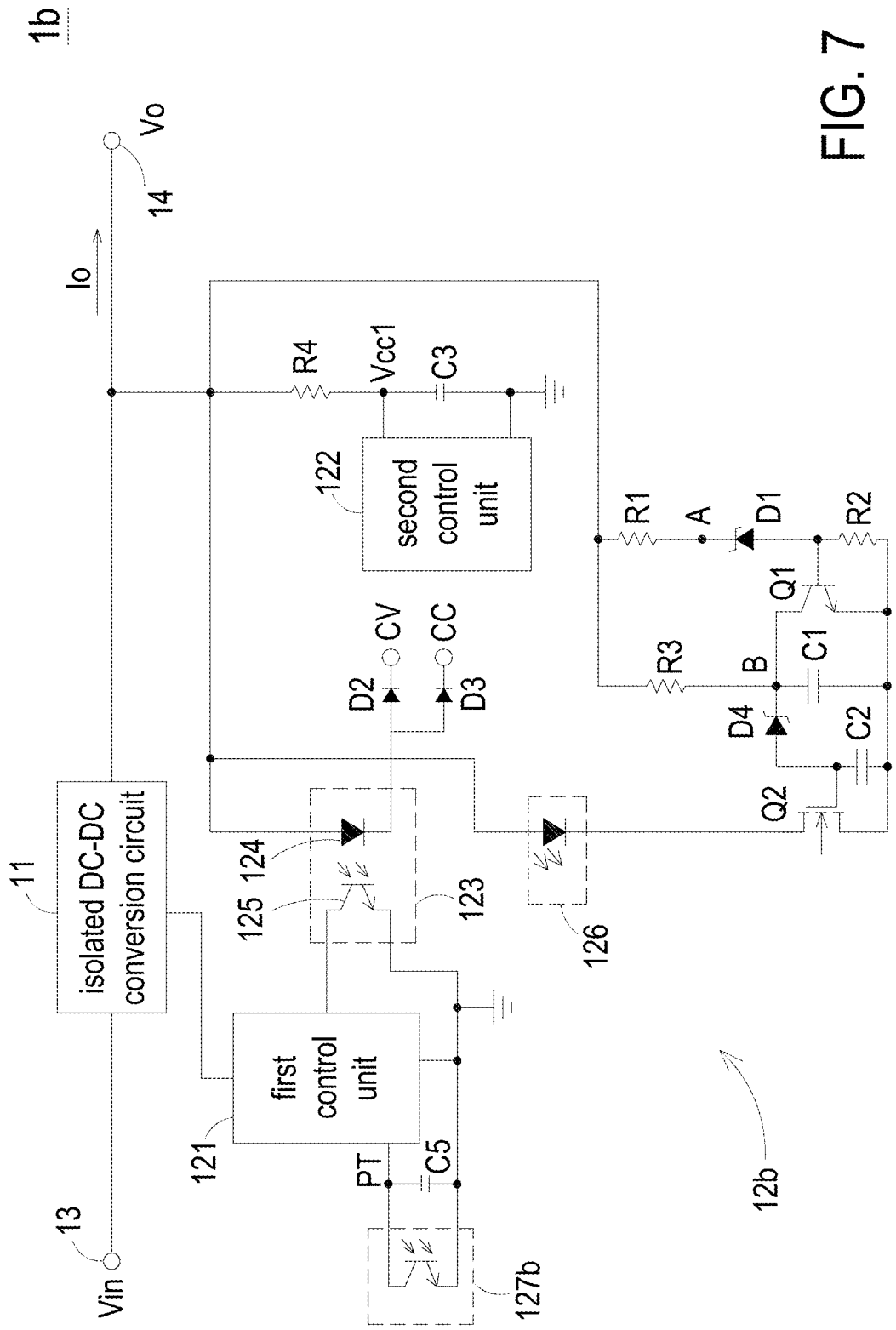
FIG. 7 is a schematic circuit diagram illustrating an LED power supply according to a third embodiment of the present disclosure.

FIG. 7 is a schematic circuit diagram illustrating an LED power supply according to a third embodiment of the present disclosure. In FIG. 7, the structure or components corresponding to those of FIG. 6 are designated by identical numeral references, and detailed descriptions thereof are omitted herein. Compared to the LED power supply 1a of FIG. 6, the disposing position of the receiver of the second optocoupler of the control module 12b is different in the LED power supply 1b of FIG. 7. As shown in FIG. 7, in the third embodiment, two terminals of a receiver 127b of the second optocoupler are electrically connected to the protection trigger terminal PT of the first control unit 121 and the ground terminal respectively. When the output voltage Vo is lower than the threshold voltage V2, based on the feedback circuit (the operation principle thereof is the same as that shown in the first embodiment), the first switch Q1 is turned off, and the second switch Q2 is turned on to trigger the second optocoupler. Accordingly, the receiver 127b of the second optocoupler generates the trigger signal to decrease the voltage level at the protection trigger terminal PT, and thus the first control unit 121 activates the protection function to control the isolate DC-DC conversion circuit 11 to stop operating. In an embodiment, the control module 12a further includes a capacitor C5 electrically connected in parallel to the receiver 127b of the second optocoupler. Consequently, in the third embodiment, the first optocoupler 123 is used to transmit the control signal for controlling the isolated DC-DC conversion circuit 11 to operate in the constant-voltage or constant-current control mode, and the second optocoupler is used to generate the trigger signal when the output voltage Vo is lower than the threshold voltage V2. Due to the voltage level at the protection trigger terminal PT decreased by the trigger signal, the first control unit 121 activates the protection function to control the isolated DC-DC conversion circuit 11 to stop operating.

Figure 8:
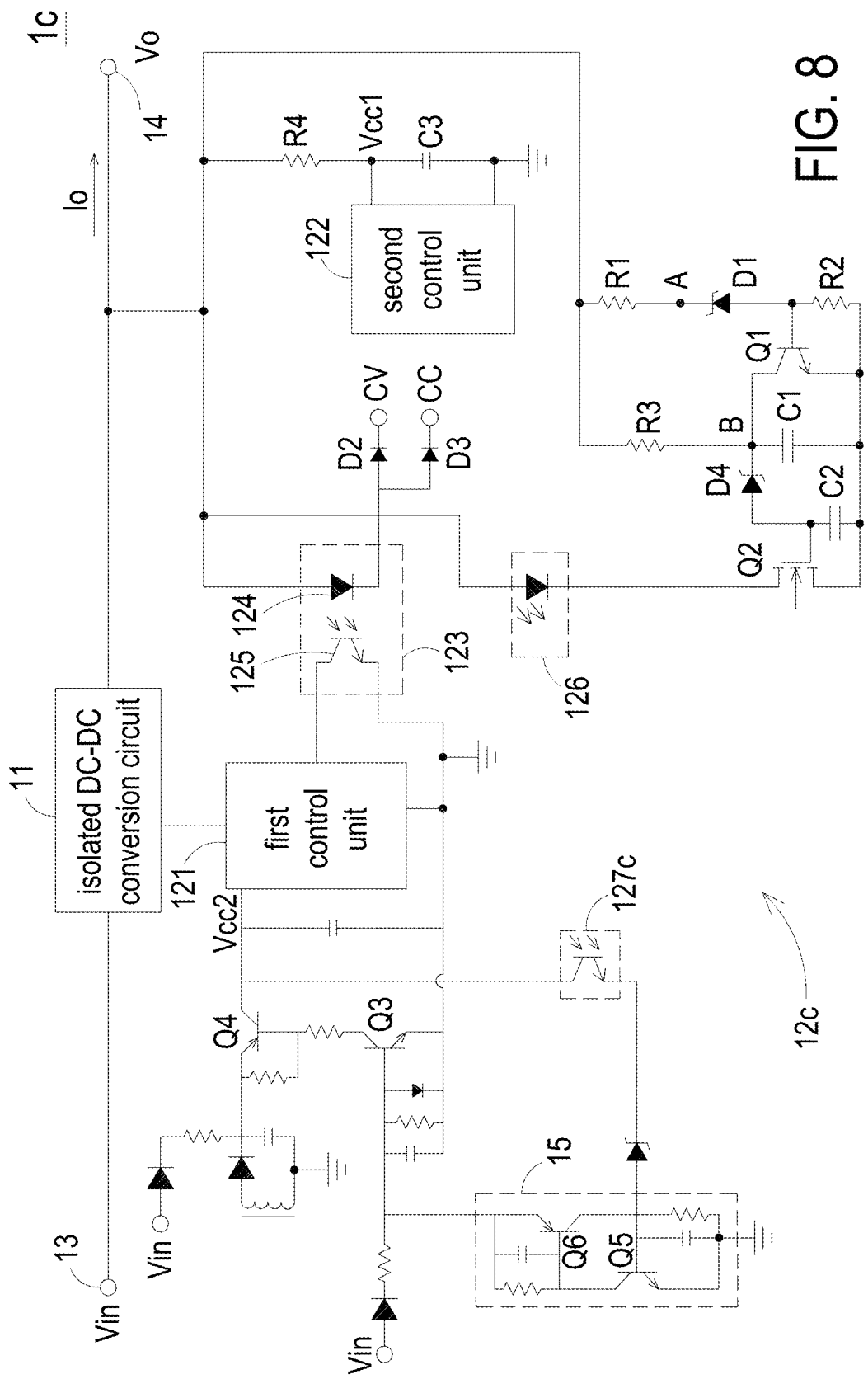
FIG. 8 is a schematic circuit diagram illustrating an LED power supply according to a fourth embodiment of the present disclosure.

FIG. 8 is a schematic circuit diagram illustrating an LED power supply according to a fourth embodiment of the present disclosure. In FIG. 8, the structure or components corresponding to those of FIG. 7 are designated by identical numeral references, and detailed descriptions thereof are omitted herein. Compared to the LED power supply 1b of FIG. 7, in the LED power supply 1c of FIG. 8, the disposing position of the receiver of the second optocoupler of the control module 12c is different, and the control module 12c includes a third switch Q3, a fourth switch Q4 and a trigger circuit 15. As shown in FIG. 8, in the fourth embodiment, the third switch Q3 and the fourth switch Q4 are configured to rectify the input voltage Vin to provide the supply voltage Vcc2 of the first control unit 121. A first terminal of the receiver 127c of the second optocoupler is electrically connected to the supply voltage Vcc2 of the first control unit 121, and the trigger circuit 15 is electrically connected to a second terminal of the receiver 127c of the second optocoupler and the third switch Q3. When the output voltage Vo is lower than the threshold voltage V2, based on the feedback circuit (the operation principle thereof is the same as that shown in the first embodiment), the first switch Q1 is turned off, and the second switch Q2 is turned on to trigger the second optocoupler. Accordingly, the receiver 127c of the second optocoupler generates the trigger signal, the trigger circuit 15 operates to turn off the third switch Q3 while receiving the trigger signal, and the fourth switch Q4 is turned off. Under this circumstance, the supply voltage Vcc2 of the first control unit 121 is grounded, and thus the first control unit 121 controls the isolated DC-DC conversion circuit 11 to stop operating. Consequently, in the fourth embodiment, the first optocoupler 123 is used to transmit the control signal for controlling the isolated DC-DC conversion circuit 11 to operate in the constant-voltage or constant-current control mode, and the second optocoupler is used to generate the trigger signal when the output voltage Vo is lower than the threshold voltage V2. Due to the grounded supply voltage Vcc2, the first control unit 121 stops generating the control signal, and thus the isolated DC-DC conversion circuit 11 stops operating, thereby realizing the protection.

In addition, the trigger circuit 15 is for example but not limited to a latch circuit including a fifth switch Q5 and a sixth switch Q6 as shown in FIG. 8. The third switch Q3 and the fifth switch Q5 may be NPN-type transistors, and the fourth switch Q4 and the sixth switch Q6 may be PNP-type transistors, but not exclusively.

In summary, the present disclosure provides an LED power supply adopting the constant-voltage/constant-current control. When the output voltage of the LED power supply is lower than a threshold voltage, the protection can be activated instantly to stop the operation of the LED power supply. Consequently, the LED power supply stops operating instantly when the output voltage is abnormal, thereby protecting the LED power supply and the LED device powered by the LED power supply.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LED (light-emitting diode) power supply, adopting constant-voltage/constant-current control, configured to supply power to an LED device, and comprising:
   an input terminal and an output terminal;
   an isolated DC-DC conversion circuit, having a primary side and a secondary side electrically connected to the input terminal and the output terminal respectively, and configured to receive an input voltage from the input terminal and provide an output voltage to the output terminal; and a control module, comprising:
    a first control unit, electrically connected to the primary side and configured to control operation of the isolated DC-DC conversion circuit;
    a feedback circuit, electrically connected to the output voltage, and comprising a first resistor, a first diode and a second resistor electrically connected in series;
    a first switch, electrically connected to the feedback circuit;
    a second switch, electrically connected to the first switch; and
    an optocoupler, configured for signal transmission with electrical isolation, and comprising a transmitter and a receiver electrically connected to the secondary side and the first control unit respectively;
  wherein when the output voltage is lower than a threshold voltage, the first switch is turned off, the second switch is turned on to trigger the optocoupler to generate a trigger signal at the receiver, and the first control unit controls the isolated DC-DC conversion circuit to stop operating based on the trigger signal.

2. The LED power supply according to claim 1, wherein when an output load of the LED power supply is less than a rated load, the isolated DC-DC conversion circuit operates in a constant-voltage control mode, the first switch is in an on state, the second switch is in an off state, an output current of the isolated DC-DC conversion circuit is less than a threshold current, and the output voltage is fixed to equal a rated voltage.

3. The LED power supply according to claim 2, wherein when the output load is greater than or equal to the rated load, the isolated DC-DC conversion circuit operates in a constant-current control mode; under the constant-current control mode, if the output voltage is higher than the threshold voltage, the first switch is in the on state, the second switch is in the off state, the output current is equal to the threshold current, and if the output voltage is lower than the threshold voltage, the first switch is in the off state, the second switch is in the on state, and the first control unit controls the isolated DC-DC conversion circuit to stop operating.

4. The LED power supply according to claim 3, wherein the threshold voltage is equal to 80% of the rated voltage.

5. The LED power supply according to claim 3, wherein the optocoupler comprises a first optocoupler, and the control module further comprises:
    a second control unit, electrically connected to the secondary side and a transmitter of the first optocoupler, and configured to detect the output voltage and the output current and generate a control signal, wherein the control signal is transmitted to a feedback terminal of the first control unit through the first optocoupler, and the first control unit controls the operation of the isolated DC-DC conversion circuit according to the control signal.

6. The LED power supply according to claim 5, wherein the control module further comprises
    a constant-voltage control terminal, electrically connected to the transmitter of the first optocoupler, and configured to receive the control signal generated by the second control unit under a condition that the output load is less than the rated load, wherein the control signal is transmitted to the first control unit through the constant-voltage control terminal and the first optocoupler, and the first control unit controls the isolated DC-DC conversion circuit to operate in the constant-voltage control mode according to the control signal; and
    a constant-current control terminal, electrically connected to the transmitter of the first optocoupler, and configured to receive the control signal generated by the second control unit under a condition that the output load is greater than or equal to the rated load and the output voltage is higher than the threshold voltage, wherein the control signal is transmitted to the first control unit through the constant-current control terminal and the first optocoupler, and the first control unit controls the isolated DC-DC conversion circuit to operate in the constant-current control mode according to the control signal.

7. The LED power supply according to claim 6, wherein the control module further comprises a second diode and a third diode, the second diode is electrically connected between the transmitter of the first optocoupler and the constant-voltage control terminal, an anode and a cathode of the second diode are electrically connected to the transmitter of the first optocoupler and the constant-voltage control terminal respectively, the third diode is electrically connected between the transmitter of the first optocoupler and the constant-current control terminal, and an anode and a cathode of the third diode are electrically connected to the transmitter of the first optocoupler and the constant-current control terminal respectively.

8. The LED power supply according to claim 5, wherein the feedback circuit further comprises a third resistor, a first capacitor, a fourth diode and a second capacitor, two terminals of the first resistor are electrically connected to the output voltage and a first node respectively, a cathode and an anode of the first diode are electrically connected to the first node and a first terminal of the second resistor respectively, two terminals of the third resistor are electrically connected to the output voltage and a second node respectively, a first terminal, a second terminal and a third terminal of the first switch are electrically connected to the second node, the anode of the first diode and a second terminal of the second resistor respectively, two terminals of the first capacitor are electrically connected to the second node and the third terminal of the first switch respectively, a cathode and an anode of the fourth diode are electrically connected to the second node and a first terminal of the second capacitor respectively, and the second switch is electrically connected to the anode of the fourth diode and the second capacitor; wherein the control module further comprises a fourth resistor and a third capacitor electrically connected in series between the output voltage and a ground terminal, the fourth resistor and the third capacitor are electrically connected to the output voltage and the ground terminal respectively, and a connection node between the fourth resistor and the third capacitor is further electrically connected to the second control unit.

9. The LED power supply according to claim 8, wherein a first voltage at the first node is proportional to the output voltage, when the output voltage is higher than the threshold voltage, the first voltage is greater than a first threshold correspondingly, the first switch is in the on state, a second voltage at the second node equals zero, and the second switch is in the off state; wherein when the output voltage is lower than the threshold voltage, the first voltage is less than the first threshold correspondingly, the first switch is in the off state, and the second voltage increases to let the second switch turn on.

10. The LED power supply according to claim 9, wherein a first terminal, a second terminal and a third terminal of the second switch are electrically connected to the second control unit, the anode of the fourth diode and the ground terminal respectively, when the output voltage is lower than the threshold voltage, the second switch is turned on to make a supply voltage of the second control unit grounded, the receiver of the first optocoupler generates the trigger signal to increase a voltage level at the feedback terminal, and the first control unit activates protection function to control the isolated DC-DC conversion circuit to stop operating.

11. The LED power supply according to claim 9, wherein the optocoupler further comprises a second optocoupler, two terminals of a transmitter of the second optocoupler are electrically connected to the output voltage and a first terminal of the second switch respectively, a second terminal and a third terminal of the second switch are electrically connected to the anode of the fourth diode and a second terminal of the second capacitor respectively, and two terminals of a receiver of the second optocoupler are electrically connected to a supply voltage and a protection trigger terminal of the first control unit respectively; wherein when the output voltage is lower than the threshold voltage, the second switch is turned on to trigger the second optocoupler, the receiver of the second optocoupler generates the trigger signal to increase a voltage level at the protection trigger terminal, and the first control unit activates protection function to control the isolated DC-DC conversion circuit to stop operating.

12. The LED power supply according to claim 9, wherein the optocoupler further comprises a second optocoupler, two terminals of a transmitter of the second optocoupler are electrically connected to the output voltage and a first terminal of the second switch respectively, a second terminal and a third terminal of the second switch are electrically connected to the anode of the fourth diode and a second terminal of the second capacitor respectively, and two terminals of a receiver of the second optocoupler are electrically connected to a protection trigger terminal of the first control unit and the ground terminal respectively; wherein when the output voltage is lower than the threshold voltage, the second switch is turned on to trigger the second optocoupler, the receiver of the second optocoupler generates the trigger signal to decrease a voltage level at the protection trigger terminal, and the first control unit activates protection function to control the isolated DC-DC conversion circuit to stop operating.

13. The LED power supply according to claim 9, wherein the optocoupler further comprises a second optocoupler, two terminals of a transmitter of the second optocoupler are electrically connected to the output voltage and a first terminal of the second switch respectively, a second terminal and a third terminal of the second switch are electrically connected to the anode of the fourth diode and a second terminal of the second capacitor respectively, a first terminal of a receiver of the second optocoupler is electrically connected to a supply voltage of the first control unit, the control module further comprises a third switch, a fourth switch and a trigger circuit, the third switch and the fourth switch are configured to rectify the input voltage to provide the supply voltage of the first control unit, and the trigger circuit is electrically connected to a second terminal of the receiver of the second optocoupler and the third switch; wherein when the output voltage is lower than the threshold voltage, the second switch is turned on to trigger the second optocoupler, the receiver of the second optocoupler generates the trigger signal, the trigger circuit makes the third switch turn off while receiving the trigger signal, and correspondingly, the fourth switch is turned off, the supply voltage of the first control unit is grounded, thus the first control unit controls the isolated DC-DC conversion circuit to stop operating.

* * * * *